T. L. LEE.
ASYNCHRONOUS MOTOR.
APPLICATION FILED NOV. 9, 1912.
1,113,565.
Patented Oct. 13, 1914.
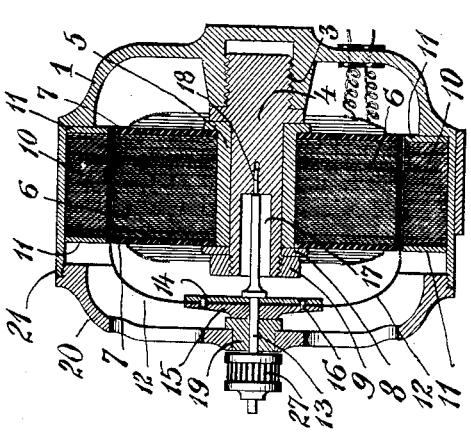
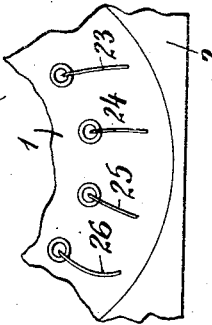
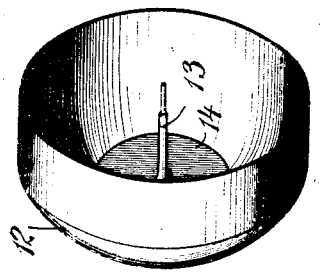
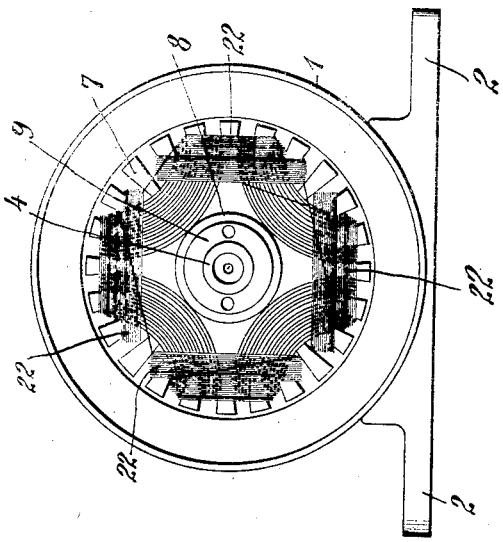
WITNESSES:
Thomas L. Lee, INVENTOR.
BY Kenyon & Kenyon, his ATTORNEYS.

UNITED STATES PATENT OFFICE.

THOMAS L. LEE, OF WESTFIELD, NEW JERSEY, ASSIGNOR TO HALL SWITCH & SIGNAL COMPANY, A CORPORATION OF MAINE.

ASYNCHRONOUS MOTOR.

1,113,565.   Specification of Letters Patent.   Patented Oct. 13, 1914.

Application filed November 9, 1912. Serial No. 730,304.

*To all whom it may concern:*

Be it known that I, THOMAS L. LEE, a citizen of the United States, and a resident of Westfield, Union county, State of New Jersey, have invented certain new and useful Improvements in Asynchronous Motors, of which the following is a specification.

My invention relates to improvements in motors, and more particularly to that class of motors known as asynchronous motors and machines which are particularly adapted to act as relays where accessibility and compactness of parts, certainty of operation, and simplicity, are important considerations.

One object of my invention is to provide a motor which is extremely simple in arrangement, which may be easily taken apart for repairs or removal of parts, and in which the moving parts are extremely light and efficient.

Further objects, features and advantages will more clearly appear from the detailed description given below, taken in connection with the accompanying drawings which form a part of this specification.

In the drawings, Figure 1 is a side view of parts of a motor embodying my improvements in one form, one frame-piece and the armature of the motor being removed for the sake of clearness; Fig. 2 is a transverse section of the motor; Fig. 3 is a perspective view of the cup-shaped armature; and Fig. 4 is a detail showing the connection of leads to the motor.

Referring to the various figures, 1 represents a frame-piece having at its base flanges 2 by means of which the motor may be suitably secured in place. The frame-piece is centrally screw-threaded at 3 and removably attached thereto, by means of coöperating screw-threads, is a central stud 4. Arranged on the stud 4 is a sleeve 5 about which are assembled laminations 6 forming the inner inductor member or field magnet. At each side of the laminations 6 there are placed insulating sheets 7, whose shape corresponds to that of the laminated pieces 6. The laminations 6 and pieces 7 are held upon the sleeve 5 and the central stud 4 by means of a washer 8 and nut 9 screw-threaded upon the inner end of the stud 4. Also secured to the frame-piece 1 is an outer inductor member 10 composed of thin rings or laminations circular in form, with suitable end pieces 11. The laminations 6 and 10 are of soft magnetic iron.

Rotating between the outer inductor member composed of laminations 10, and the inner inductor member composed of laminations 6, etc., is a cup-shaped armature 12 made of conducting material, such as copper. The cup-shaped armature 12 is secured to a shaft 13 by means of members 14 and 15 and rivets 16. The stud 4 is recessed at its inner end at 17 and the shaft 13 projects through this recessed portion and has its bearings or is journaled in the stud 4 at 18, about midway between the ends of the stud 4. At its opposite end the shaft 13 is journaled in a bearing 19 situated in a frame-piece 20. The frame-piece 20 is screw-threaded to the frame-piece 1 at 21, so that it is removably secured thereto.

Field windings 22 may be wound upon the inner inductor member, as shown in Fig. 1. These field windings are adapted to carry alternating current in order to produce a suitable shifting field whereby the armature 12 is caused to rotate. In the present instance, the field is produced by means of current introduced by means of the four leads 23, 24, 25 and 26.

On the outer end of the shaft 13 is provided a gear 27 which may be used to operate the switch mechanism of a relay, or any other suitable or desired mechanism.

The operation of such motors is well understood by those skilled in the art. It will, therefore, only be necassary to point out that in order to get the maximum torque in a motor of this class, for its size, I have constructed the armature of a thin cup of copper and placed all the exciting windings of the machine on the inductor member inside the armature, so that the diameter of the armature is made relatively larger to increase the torque without necessarily increasing the size of the machine. Since the outer inductor member or iron at 10 is carried by the field frame 1, the moving parts are made extremely light and efficient. Moreover, by having the inner inductor member or laminations 6 carried upon the central stud 4, which is removable from the frame 1, the field magnet may easily be removed from the frame for repair or removal of parts. In order to take the motor apart, it is only necessary to unscrew the frame 20 from the frame 1, which operation also removes the armature 12, and then unscrew the stud 4 from the frame 1, whereupon the field magnet is entirely removed. The armature 12 and its shaft 13 may be removed from the frame 20 by loosening gear 27.

Although I have described my improvements in great detail and with respect to one particular embodiment thereof, nevertheless, it will be obvious that various changes and modifications may be made without departing from the spirit and scope of my invention in its broader aspects, and I therefore do not desire to be limited to the details shown and described, except as clearly pointed out in the appended claims.

Having fully and clearly described my invention, what I claim as new and desire to secure by Letters Patent, is:

1. A motor comprising a frame piece, a central stud screw threaded thereto and carrying an inner fixed inductor member having alternating current field windings, an outer fixed inductor member carried by said frame piece, a second frame piece screw threaded to the first frame piece, a shaft journaled in said stud and said second frame piece, and a cup shaped armature of conducting material secured to said shaft and rotatable between said inductor members, all of the exciting windings being on the inner inductor member, said armature having one of its bearings in said second frame piece.

2. A motor comprising a frame piece, a central stud removably attached to said frame piece and carrying an inner fixed inductor member having alternating current field windings, an outer fixed inductor member, a second frame piece removably attached to the first frame piece, one of said frame pieces substantially encircling the magnetic parts of the motor, a shaft journaled in said stud and said second frame piece, and a cup shaped armature of conducting material secured to said shaft and rotatable between said inductor members.

3. A motor comprising a frame piece substantially encircling the magnetic parts of the motor, a stud removably attached to said frame piece, and carrying an inner fixed inductor member having alternating current field windings, a second frame piece removably attached to the first frame piece, a shaft journaled in said stud and said second frame piece, and a cup shaped armature of conducting material secured to said shaft and rotatable between said inductor members.

In testimony whereof, I have signed my name to this specification, in the presence of two subscribing witnesses.

THOMAS L. LEE.

Witnesses:
D. GURNEE,
E. A. HALBLEIB.